(12) United States Patent
Mitamura et al.

(10) Patent No.: US 6,551,085 B1
(45) Date of Patent: Apr. 22, 2003

(54) BLADDER FOR VULCANIZER, VULCANIZER USING THE SAME AND VULCANIZING-MOLDING METHOD

(75) Inventors: Hisashi Mitamura, Takasago (JP); Yasuhiko Fujieda, Takasago (JP); Kazuhisa Fujisawa, Kobe (JP); Kazuto Okada, Kobe (JP); Akira Sakurai, Kobe (JP); Hirohiko Fukumoto, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 09/570,345

(22) Filed: May 12, 2000

(30) Foreign Application Priority Data

May 12, 1999 (JP) ............................................. 11-130775
May 12, 1999 (JP) ............................................. 11-130776

(51) Int. Cl.[7] .............................................. B29C 35/00
(52) U.S. Cl. ............................... 425/35; 249/65; 425/43
(58) Field of Search .................... 264/315, 326, 264/404; 156/416; 425/51, 52, 41, 35, 43; 249/65

(56) References Cited

U.S. PATENT DOCUMENTS

| | | | |
|---|---|---|---|
| 1,801,335 A | | 4/1931 | Denmire |
| 2,451,992 A | | 10/1948 | Grotenhuis |
| 2,586,526 A | | 2/1952 | Enabnit |
| 2,594,139 A | | 4/1952 | Enabnit |
| 3,144,374 A | * | 8/1964 | Saint Paul ................. 156/416 |
| 3,249,658 A | | 5/1966 | Hodges |
| 3,294,606 A | | 12/1966 | Morgan et al. |
| 3,837,770 A | | 9/1974 | Gazuit |
| 3,922,188 A | * | 11/1975 | Appleby ..................... 156/416 |
| 3,932,088 A | | 1/1976 | Harada et al. |
| 4,699,578 A | * | 10/1987 | Sumner et al. ............. 264/326 |
| 4,877,469 A | * | 10/1989 | Szyms et al. ................. 425/52 |
| 5,062,781 A | | 11/1991 | Szyms et al. |
| 5,837,088 A | | 11/1998 | Palmgren et al. |

FOREIGN PATENT DOCUMENTS

| | | |
|---|---|---|
| EP | 0 711 643 | 5/1996 |
| GB | 172699 | 12/1921 |
| GB | 643120 | 9/1950 |
| GB | 727953 | 6/1953 |
| GB | 784022 | 10/1957 |

\* cited by examiner

Primary Examiner—Mathieu D. Vargot
(74) Attorney, Agent, or Firm—Oblon, Spivak, McClelland, Maier & Neustadt, P.C.

(57) ABSTRACT

A bladder for a vulcanizer includes, as a constituent member, a low elongation material with stable properties at vulcanization temperatures. During a vulcanization-molding process, the bladder is pressed against the inner surface of a green tire using a pressurized medium. The pressurized medium can be at vulcanization temperatures. The bladder has substantially the same shape as the inner wall surface of the tire that is formed using the bladder. As a result, irregularities in the shape of the inner wall surface of a tire rarely occur, and the frequency of exchange of bladders can be reduced. The vulcanizer bladder can include a conductive material or a magnetic material, both of which can be heated by using an induction heating coil. The use of both heat from the pressurized medium and heat generated in the bladder to vulcanize a green tire can shorten the period of time required for vulcanizing-molding.

6 Claims, 8 Drawing Sheets

STEAM

BLADDER FOR VULCANIZER, VULCANIZER USING THE SAME AND VULCANIZING-MOLDING METHOD

BACKGROUND OF THE INVENTION

1. Field of the Invention

The present invention relates to a bladder for a vulcanizer in which, when a green tire is subjected to vulcanizing-molding, the inner wall surface of the tire is pressed in a mold direction by a heat medium. The present invention further relates to a vulcanizing-molding method for vulcanizing-molding a green tire by pressing the inner wall surface of the tire in a mold direction through the bladder, and to a vulcanizer.

2. Description of the Related Art

Conventionally, a bladder type vulcanizer is provided with a bladder formed of rubber such as butyl rubber having excellent flexibility in an expansible manner. In vulcanizing-molding a green tire, first, the bladder is contracted so as to have a smaller diameter than that of a tire bead of the green tire, the green tire is inserted into a bladder stood-up portion, the bladder is then inflated, the green tire is held so that the bladder is placed along the inner surface of the green tire, and a mold is clamped. Thereafter, a heat medium of high temperature and high pressure is supplied into the bladder to stretch the bladder into close contact with the inner wall surface of the tire, and the bladder is pressed in a mold direction while heating the inner wall surface of the tire through the bladder to thereby form a tire groove of the mold in the tread portion of the green tire. At the same time, the green tire is heated from outside and inside thereof by the heated mold and the bladder in contact with the heat medium of high temperature to vulcanize it. After passage of a fixed vulcanizing time, the mold is opened and the bladder is contracted. The vulcanized tire is then removed from the bladder and carried outside the machine, thus completing the vulcanizing-molding.

However, rubber in a conventional bladder is apt to harden at high temperatures. This leads to a decrease in pressing force, and to elongation, of the bladder with repeated use in vulcanization-molding. As a result, after a conventional rubber bladder is used a number of times to vulcanize tires, irregularities in the shape of the inner wall surface of the vulcanized tires become noticeable. The irregularities lead to lower tire quality. In order to maintain tire quality within set ranges, conventional rubber bladders are replaced after every 300–400 uses, which has greatly hindered mass production of tires.

Furthermore, when vulcanizing-molding is carried out using a bladder made of rubber, the bladder itself impedes heat transmission to a green tire when a heat medium is supplied into the bladder to heat the green tire because the thermal conductivity of rubber is low. Accordingly, it takes a long time for the green tire to heat to the vulcanizing temperature after a supply of the heat medium, thus delaying vulcanizing-molding, and resulting in a lowering of productivity.

SUMMARY OF THE INVENTION

The present invention provides a vulcanizer bladder which decreases the occurrence of irregularities in the shape of the inner wall of tires, so that the frequency of exchange of the bladder in a vulcanizer can be reduced. The present invention also provides a vulcanizing-molding method and a vulcanizer capable of completing the vulcanizing-molding in a short period of time.

The vulcanizer bladder according to the present invention is a bladder that, after being supplied with a pressurized medium, presses against the inner wall surface of a green tire towards a mold during vulcanizing-molding. The bladder has, as a constituent member, a low elongation material that has stable properties at vulcanization temperatures. The bladder is formed so that, before use, it has substantially the same shape as the inner wall surface of the vulcanized tire that results after vulcanization-molding.

In this case, since the bladder is formed of a low elongation material formed or shaped to have the shape of the inner wall surface of the vulcanized tire, the bladder is merely stretched by pressure gas whereby the shape of the inner wall surface of the vulcanized tire can be realized by the bladder. Accordingly, the green tire is pressed by the bladder for vulcanizing-molding to thereby vulcanize-mold the green tire with high accuracy. Since the low elongation material has stable properties at high temperatures, even when vulcanizing-molding is repeated, the low elongation material maintains its initial properties. Thus, even when the frequency of vulcanizing-molding increases, green tires can be vulcanized and molded with rare occurrence of irregularities in the shape of the inner wall surface of a tire. As a result, the frequency of exchange of the bladder can be reduced.

The low elongation material preferably has an elongation at 200° C. in the range of 5% to 15%.

In this case, high-accuracy vulcanizing-molding of green tires can be realized repeatedly.

Preferably, the low elongation material is formed of knitwork or woven stuff, and comprises at least one of organic fibers such as nylon, polyester, aramid, poly-paraphenylene benzo-bis-oxazol (PBO), polyphenylene sulfide, overall aromatic polyester, etc., inorganic fibers such as glass fiber, carbon fiber, etc., metal cord material, carbon-contained fiber, metal-coated fiber, and resin-coated fiber.

In this case, various low elongation materials can be combined to provide a bladder most suitable for conditions of vulcanizing-molding.

Further, preferably, resin such as fluoride, silicone, etc., and at least one kind of elastomer is impregnated in or coated on the low elongation material.

In this case, air-tightness of the bladder can be made to approximately the same as a bladder made of butyl rubber, and it is possible to prevent the pressure medium from leaking outside the bladder.

Further, in the vulcanizing-molding according to the present invention, when a pressurized medium is supplied into the bladder, and the inner wall surface of a tire is pressed in a mold direction through the bladder, the bladder itself can act as a source of heat.

The vulcanizer according to the present invention is a vulcanizer in which the inner wall surface of a green tire charged into a mold is pressed in a mold direction and heated to vulcanize and mold the green tire. The vulcanizer comprises a bladder that can have a conductive material in at least a part thereof. The bladder can be stretched by a supply of a pressurized medium to press the inner wall surface of the green tire toward a mold while heating the tire. A power supply can supply power to the conductive (i.e. resistive) material in the bladder can heat the bladder.

In this case, since the heat generated in the bladder can be utilized for heating the inner wall surface of a tire, the inner wall surface of a tire can be heated for vulcanizing-molding without using a pressurized medium of high temperature and high pressure as in the prior art. Furthermore, when both the high temperature pressurized medium and the conductive material both supply heat to the green tire, the vulcanizing-molding can be completed in a shorter vulcanizing time.

Preferably, the conductive material comprises one or more of conductive rubber, conductive fiber, conductive resin, meal cord material and heat generating coil.

In this case, the bladder can be formed easily.

Preferably, the conductive material is concentrated in the "vulcanization delay part" of the bladder, which generally presses against the thicker wall portions of the green tire (mainly, portions of the tread and bead) where vulcanization is slowest in order to concentrate heat and accelerate vulcanization relative to other parts of the green tire.

In this case, since the vulcanization delay part of the bladder receives a supply of more heat than other parts, the thicker wall portion of the green tire corresponding to the vulcanization delay part can be heated rapidly. Accordingly, vulcanizing-molding of the green tire can be completed in a shorter period of time.

The vulcanizer according to the present invention is a vulcanizer in which the inner wall surface of a green tire charged into a mold is pressed in a mold direction and heated to vulcanize and mold the green tire, and comprises a bladder, which can have a conductive material in at least a part thereof and which can be stretched by a supply of a pressurized medium to press the inner wall surface of the green tire toward the mold.

In this case, it is possible to heat the bladder itself, and the heat generated in the bladder is utilized for heating the inner wall surface of a tire. Therefore, the vulcanizing-molding can be completed in vulcanizing time reduced by time required for heating the bladder, as compared with the conventional case where the pressurized medium applies the heat quantity to the bladder to heat the latter, after which the inner wall surface of a tire is heated.

Preferably, a magnetic material can be concentrated in the vulcanization delay part so that heat generation in the vulcanization delay part corresponding to the thicker wall portions of the green tire is accelerated relative to other parts.

In this case, since the vulcanization delay part of the bladder receives a supply of more heat than other parts, the thicker wall portions of the green tire corresponding to the vulcanization delay part can be heated rapidly. Accordingly, the vulcanizing-molding of the green tire can be completed in a shorter period of time.

Even where the bladder has a low elongation material as a constituent member, it may have the conductive material or the magnetic material in a part of the bladder. In this case, it is preferable in that a geometrical effect is obtained.

DESCRIPTION OF THE PREFERRED EMBODIMENTS

The embodiments of the present invention will be described hereinafter with reference to FIGS. 1 to 8.

Figure 2:
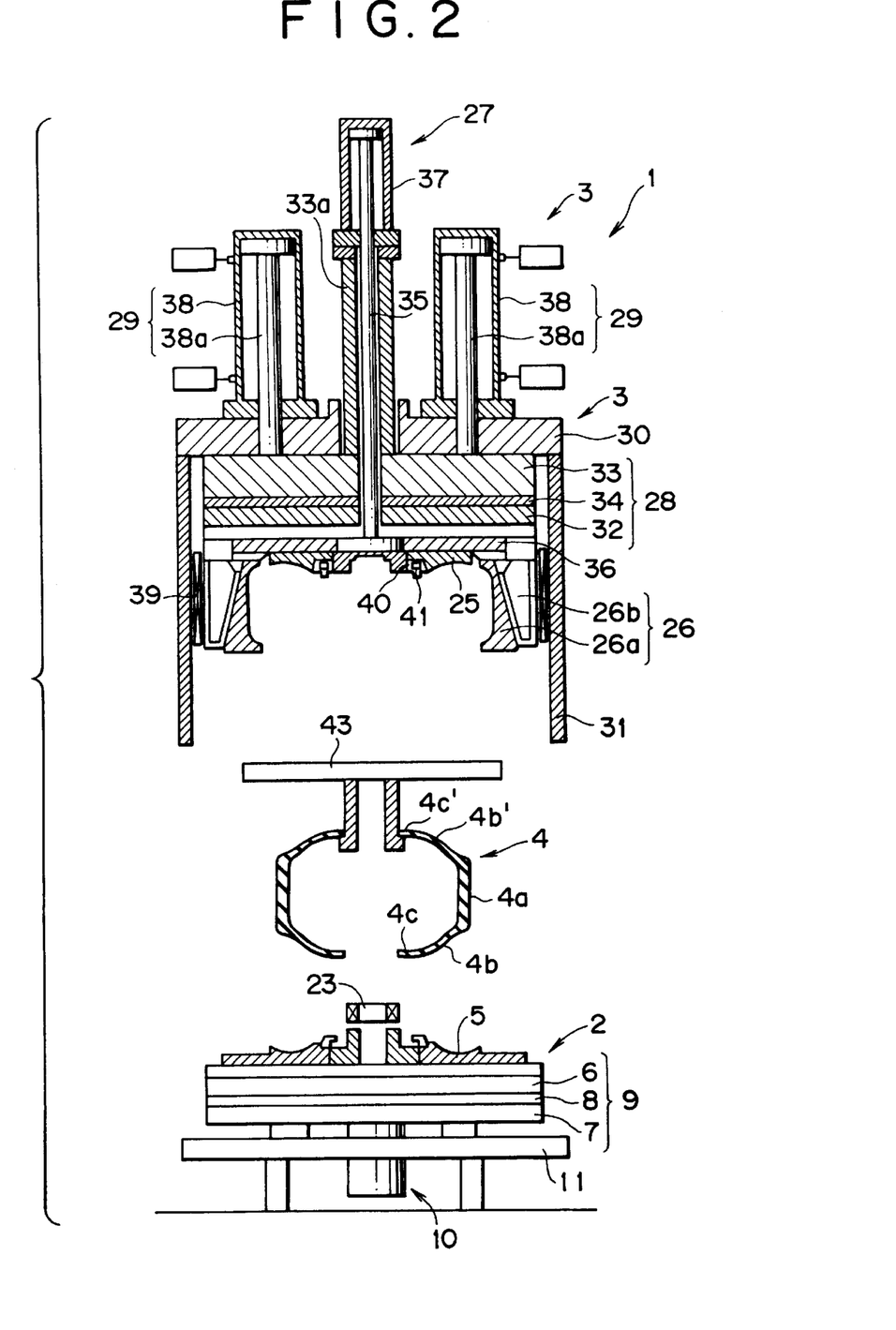
FIG. 2 shows a green tire being carried in a vulcanizer.

As shown in FIG. 2, a bladder according to the present invention is provided on a vulcanizer 1 for vulcanizing-molding a green tire 4. The vulcanizer 1 has a mold locking portion 2 set to a predetermined height position, and a mold elevating portion 3 which goes up and down relative to the locking portion 2. The locking portion 2 has a lower side mold 5 in contact with a lower side wall 4b of the green tire 4, a lower heating mechanism 9 for heating the lower side mold 5 up to predetermined temperature, a center mechanism 10 provided in the center portion of the lower heating mechanism 9 and the lower side mold 5, and a base plate 11 for supporting the center mechanism 10 and the lower heating mechanism 9.

Figure 5:
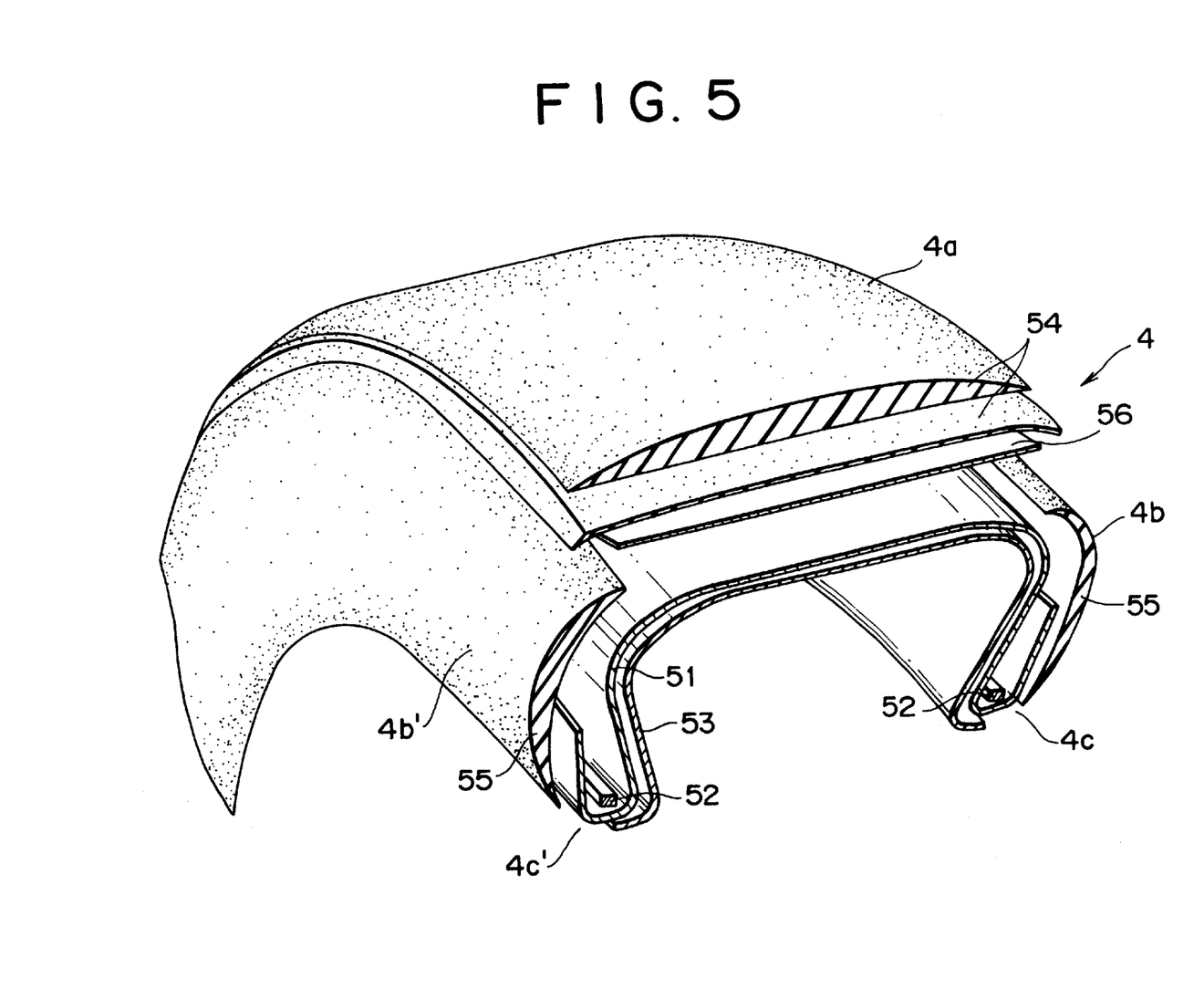
FIG. 5 is an exploded perspective view showing the main parts of a tire.

As shown in FIG. 5, the green tire 4 has a carcass assembly 51 having both ends curved, a bead wire 52 made of metal provided on the curved portion of the assembly 51, an inner liner 53 made of rubber pasted on the inner peripheral surface of the assembly 51, a tread member 54 made of rubber and a side wall member 55 pasted on the outer peripheral surface and the side peripheral surface, respectively, of the assembly 51, and a belt member 56 made of metal provided between the tread member 54 and the assembly 51. This provides the constitution in which the metal members (the bead wire 52 and the belt member 56) are housed in the tire comprising a tread portion 4a, and bead portions 4c and 4c' which are large in wall-thickness.

Further, as shown in FIG. 2, the lower heating mechanism 9 of the mold locking portion 2 has a disk-shaped lower platen 6 for supporting the lower side mold 5 in a face fashion. The lower platen 6 has an internal space to which high temperature steam is supplied, which is heated by steam supplied to the space to heat the lower side mold 5 in a face fashion. The lower heating mechanism 9 has a platen support 7 for supporting the platen 6, and a heat insulating plate 8 interposed between the lower platen 6 and the platen support 7 so as not to transmit heat to the platen support 7.

Figure 3:
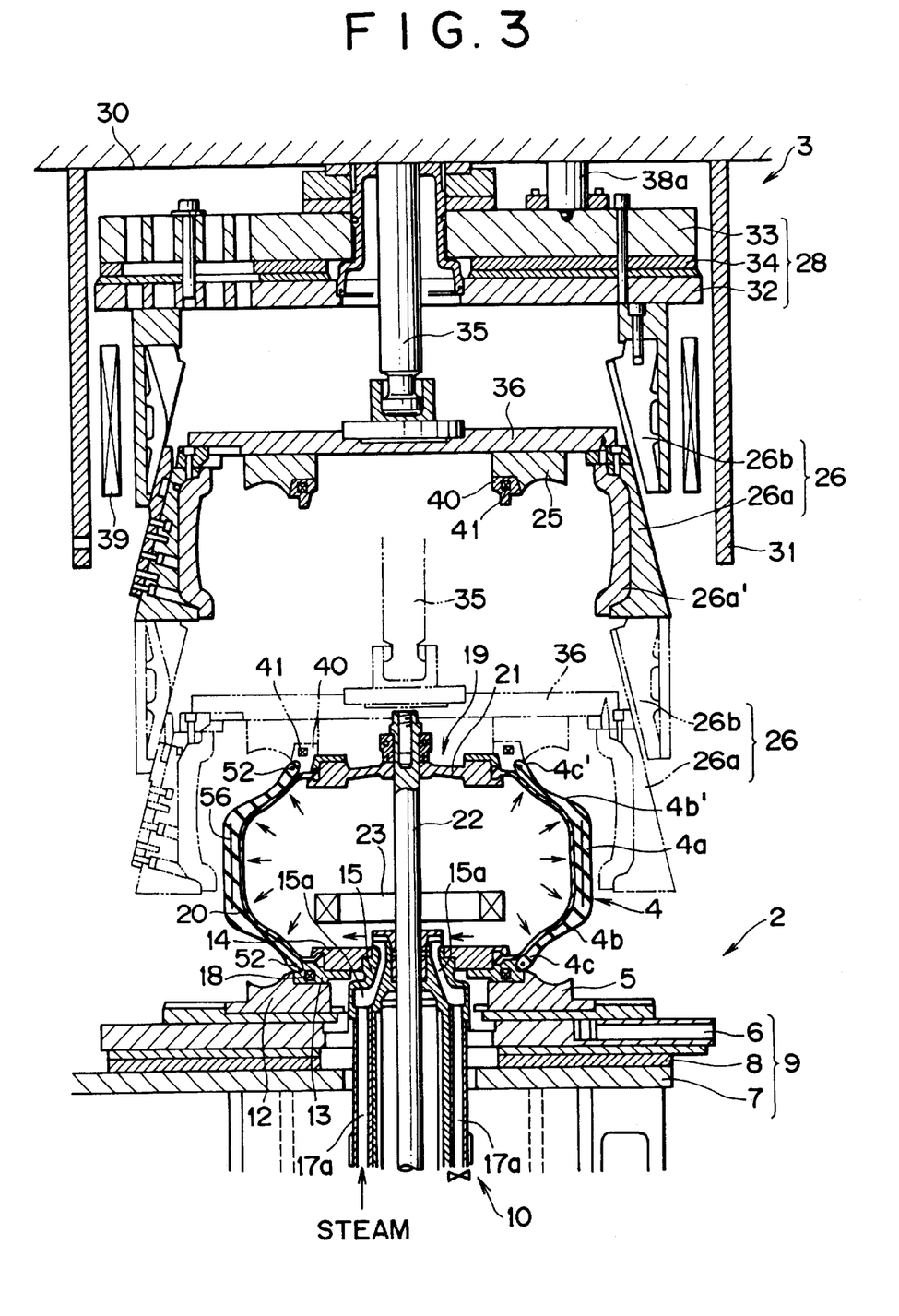
FIG. 3 shows a vulcanizer clamping a green tire.

Further, as shown in FIG. 3, the center mechanism 10 provided in the center portion of the lower heating mechanism 9 has a lower ring 12 placed in contact with the lower side mold 5. The lower ring 12 has a lower bead ring 13 formed so as to be placed in contact with the lower bead portion 4c of the green tire 4, a lower bladder ring 14 provided on the upper surface of the lower bead ring 13 to hold the lower edge portion of a bladder 20 in cooperation with the lower bead ring 13, and a clamp ring hub 15 provided on the inner peripheral side of the lower bladder ring 14. The clamp ring hub 15 is internally formed with gas supply and discharge paths 15a and 15a which allow a pressurized medium such as steam or nitrogen gas to enter or exit. These gas supply and discharge paths 15a and 15a are communicated from the upper end surface to the lower end surface of the clamp ring hub 15, and the gas supply and discharge paths 15a and 15a at the lower end are connected to a as supply device not shown through gas piping 17a and 17a.

The lower bead ring 13 is internally provided with an annular first induction heating coil 18. To this coil 18 is connected a high frequency power supply 24 shown in FIG. 1 for supplying high frequency power. In the coil 18, a strong high frequency magnetic field is applied to the lower bead portion 4c of the green tire 4 by the supply of high frequency power to thereby induction heat the bead wire 52 of the lower bead portion 4c in preference.

In the center portion of the lower ring 12 is stood upright a center post 22 vertically slidably and in an airtight state. An upper ring 19 is provided on the upper end of the post 22. The upper ring 19 has an upper bladder ring 21, which holds the upper end portion of the bladder 20. On the other hand, a post elevating mechanism (not shown) for moving up and down the post 22 to a suitable height position is connected to the lower end portion of the post 22. This elevating mechanism raises the upper edge portion of the bladder 20 to move up the post 22 to an upper limit position, in carrying in and out the bladder 20, so as to set the bladder 20 to a smaller diameter than a tire hole of the green tire 4, whilst in vulcanizing-molding the green tire 4, the mechanism moves down the post 22 so that the bladder 20 is enlarged to a diameter capable of being placed in contact with the inner wall surface of the crude tire 4.

Figure 1:
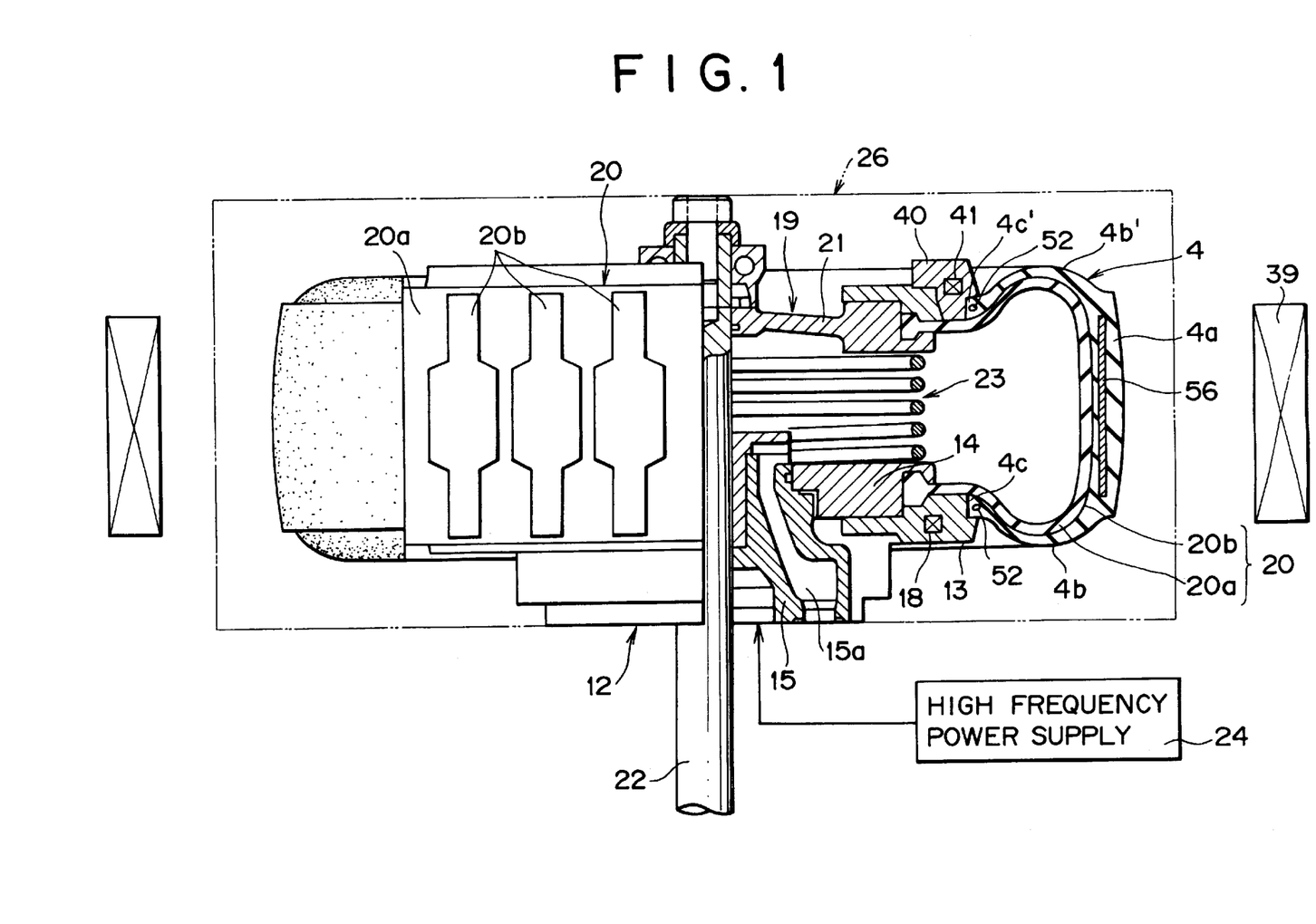
FIG. 1 shows a vulcanizer during a vulcanizing-molding process.

The bladder 20 spread and contracted by the center post 22 presses the inner wall surface of the tire in a mold direction by being supplied with the pressurized medium at the time of vulcanizing-molding the green tire 4, and has, as a constituent member, a low elongation material which is stable in properties at high temperatures. This low elongation material is formed into substantially the same shape as the shape of the inner wall surface of the tire when the green tire 4 is vulcanized-molded into a vulcanized tire. That is, as shown in FIG. 1, the bladder 20 has, employing polyester as a low elongation material with stable high temperature properties, a bladder main body 20a with the polyester formed into substantially the same shape as the shape of the inner wall surface of the vulcanized tire, and a plurality of magnetic members 20b provided at equal intervals on the surface of the bladder main body 20a. The magnetic member 20b comprises a film made of metallic material having magnetic properties, for example, such as mesh metal or metal vapor-deposition film, and is formed so that a part corresponding to the tread portion 4a of the green tire 4 has a larger area than other parts.

The low elongation material is a material having a value of properties having a smaller elongation than conventional rubber for bladder (for example, butyl rubber) under the environment of high temperature of vulcanizing temperature, particularly preferably, elongation is in the range of 5% to 15% under the environment of high temperature at 200° C. The reason why elongation is preferably in the range described above is that if it is less than 5%, the force for pressing the whole green tire 4 uniformly at the time of vulcanizing-molding decreases so that molding properties is insufficient, and if it exceeds 15%, it is difficult to vulcanize-mold the green tire 4 with high accuracy similar to the conventional rubber for bladder (for example, butyl rubber).

As a thermally stable, low elongation material there can be employed, in addition to the aforementioned polyester, knitwork or woven stuff using fibers such as organic fibers such as nylon, aramid, polyparaphenylene benzo-bis-oxazol (PBO), polyphenylene sulfide, and overall aromatic polyester, and inorganic fibers such as glass fiber and carbon fiber, or mesh metal, high density fiber, carbon-contained fiber, metal coated fiber, resin coated fiber, etc. and can be employed a mixture comprising one such material or more. Mixed forms include a form of a laminate construction, for example, such that mesh metal is laminated on a polyester film, and a metal film is vapor-deposited on a polyester film, or a form in which a metal coated fiber and a high density fiber are woven uniformly or one-sidedly. There is a further form, in which a resin such as fluoride resin and silicone resin and at least one kind of elastomer are impregnated in or coated on a base of the aforementioned knitwork or woven stuff. These forms are suitably selected according to the design and specification (presence or absence of heat generation due to induction heating or strength).

A second induction heating coil 23 is arranged internally of the bladder 20. This coil 23 is provided around the center post 22, and is set to a smaller coil height than the distance where the upper bladder ring 21 is closest to the lower bladder ring 14 and set to a smaller coil diameter than a diameter of both the rings 21 and 14 so as not in contact with the reduced bladder 20. Further, the coil 23 is arranged so as not to come into contact with both the rings 21 and 14 even where the upper bladder ring 21 moved down to a lower limit position. To the coil 23 is connected a high frequency power supply 24, and the coil 23 applies an intensive high frequency magnetic field to the bladder 20 by a supply of high frequency power to induction heat the magnetic member 20b of the bladder in preference.

A mold elevating portion 3 is provided above the center post 22 for spreading and contracting the bladder 20, as shown in FIG. 2. The mold elevating portion 3 has an upper side mold 25 in contact with the upper side wall 4b' of the green tire 4, a split mold 26 positioned in an outer peripheral direction of the tread portion 4a of the green tire 4, a first mold elevating mechanism 27 for moving up and down the upper side mold 25 and a slide segment 26a of the split mold 26, an upper heating mechanism 28 for heating the upper side mold 26 to predetermined temperature, a second mold elevating mechanism 29 for moving up and down the upper heating mechanism 28 and a locking segment 26b of the split mold 26, and a support member 30 for supporting these mechanisms 27 to 29.

The upper heating mechanism 28 has a disk-shaped upper platen 32. The upper platen 32 has an internal space to which is supplied high temperature vapor, and heat is generated by the vapor supplied to the space to heat the upper side mold 25 in a face fashion. The upper heating mechanism 28 has a platen support 33 for supporting the upper platen 32, and a heat insulating plate 34 interposed between the upper platen 32 and the platen support 33 so as not to transmit heat of the upper platen 32 to the platen support 33.

A rod-like member 35 of the first mold elevating mechanism 27 is inserted movably up and down into the center portion of the upper heating mechanism 28. A disk-shaped slide plate 36 is provided at the lower end of the rod-like member 35. The upper side mold 25 is fixedly mounted on the center side in the center portion of the lower surface of the slide plate 36. An upper bead ring 40 formed in contact with the upper bead portion 4c' of the green tire 4 is provided on the inner peripheral portion of the upper side mold 25. The upper bead ring 40 is internally provided with an annular third induction heating coil 41. This coil 41 has the high frequency power supply 24 of FIG. 1 connected thereto, and the coil 41 induction-heats in preference a bead wire 52 of the upper bead portion 4c' by applying an intensive high frequency magnetic field to the upper bead portion 4c' by a supply of high frequency power.

A slide segment 26a having a plurality of segment molds 26a' formed of a non-magnetic material such as aluminum is provided on the outer peripheral portion of the lower surface of the slide plate 36. The slide segments 26a are arranged at equal intervals on the concentric circle about the upper side mold 25, and engaged movably in the center direction. A plurality of fixed segments 26b formed of a non-magnetic material are arranged in the outer direction of the slide segments 26a. The fixed segments 26b are fixedly mounted on the peripheral edge of the lower surface of the upper platen 32 to move forward and backward the slide segment 26a in the radial direction while engaging the outer surface of the slide segment 26a. The slide segment 26a forms, when moved in the center direction by the fixed segment 26b, a tubular-shaped mold corresponding to the tread portion 4a of the green tire 4.

On the other hand, the upper end of the rod-like member 35 is connected to a first cylinder member 37. The first cylinder member 37 is supported by an insert portion 33a risen from the center portion of the upper surface of the platen support 33. With this, the first mold elevating mechanism 27 having the first cylinder member 37 and so on to move up and down the slide plate 36 (the upper side mold 25, the slide segment 26a) through the rod-like member 35 independently of the support member 30 and the upper heating mechanism 28.

The insert portion 33a supporting the first cylinder member 37 has the rod-like member 35 movably inserted therein, and is movably inserted into the support member 30. A pair of left and right mold elevating mechanisms 29 are arranged on both sides of the insert portion 33a. Each second mold elevating mechanism 29 has a second cylinder member 38 fixedly mounted on the upper surface of the support member 30. The second cylinder member 38 has a cylinder rod 38a whose end is connected to the platen support 33 so as to move up and down the upper heating mechanism 28.

A tubular-shaped shield member 31 fallen from the peripheral edge portion of the support member 30 is arranged in the outer peripheral direction of the upper heating mechanism 28 and the split mold 26. A fourth induction heating coil 39 is provided between the shield member 31 and the split mold 26. A high frequency power supply 24 of FIG. 1 is connected to the coil 39, which induction-heats a belt member 56 of the tread portion 4a in preference by applying an intensive high frequency magnetic field to the tread portion 4a of the green tire 4 by a supply of high frequency power.

In the above-described constitution, the operation of the bladder 20 and the vulcanizing-molding method will be described through the operation of the vulcanizer 1.

First, as shown in FIG. 2, the mold elevating portion 3 is moved up to thereby position the mold elevating portion 3 above the mold locking portion 2. As shown in FIG. 3, by moving up the center post 22 of the center mechanism 10, the upper edge portion of the bladder 20 is raised through the upper ring 19 to contract the bladder 20 to a smaller diameter than the tire hole of the green tire 4. After this, the green tire 4 is carried to and between the mold locking portion 2 and the mold elevating portion 3 by the carrying device 43 so that the tire hole of the green tire 4 assumes a position above the center post 22. The green tire 4 is held on the lower side mold 5 while moving down the green tire 4 and inserting the center post 22 and the bladder 20 into the tire hole of the green tire 4, after which the bladder 20 is inflated and the green tire 4 is subjected to shaping and held.

Figure 4:
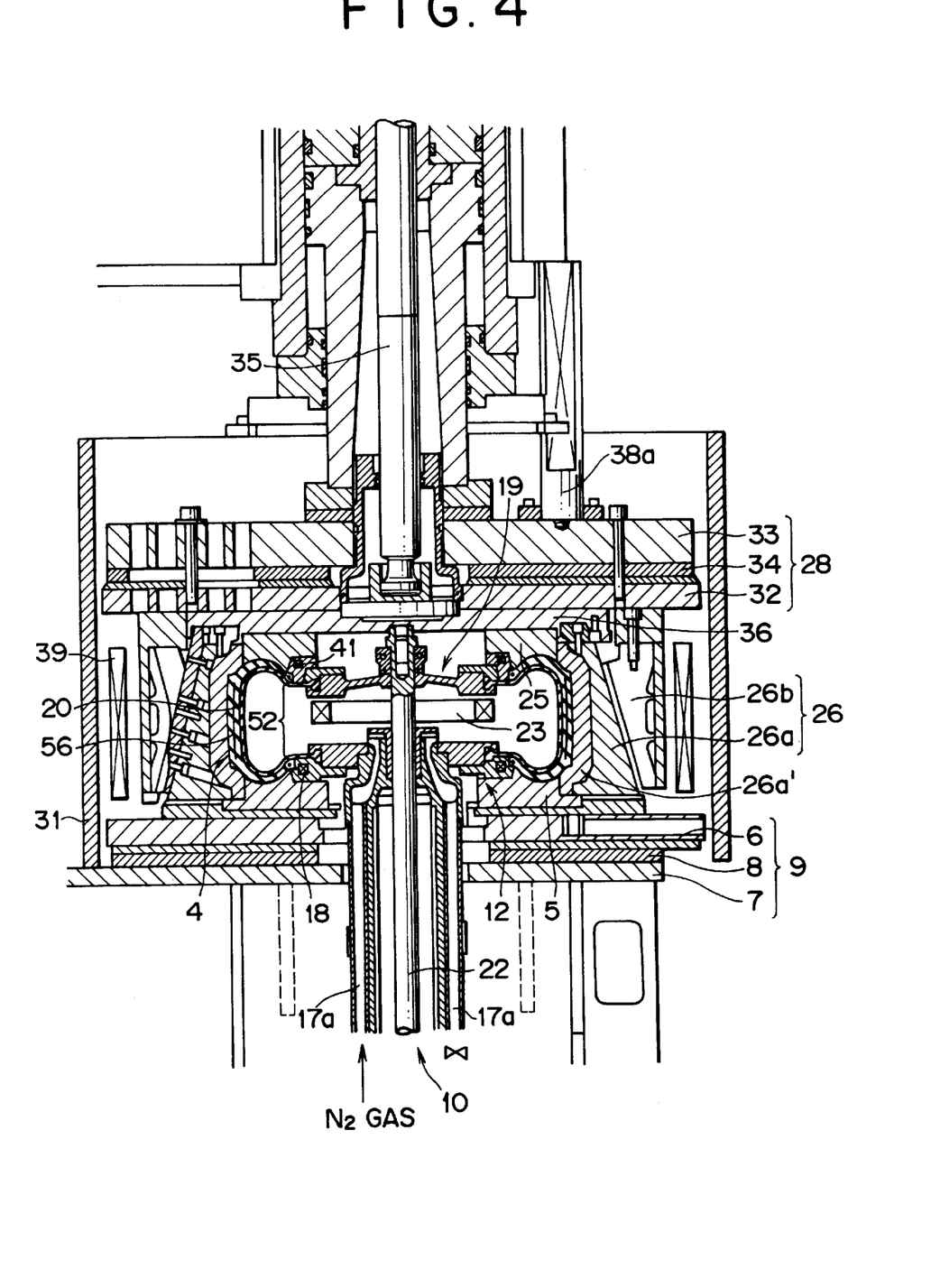
FIG. 4 shows a green tire clamped in a vulcanizer.

Subsequently, the rod-like member 35 is moved out of the first cylinder member 37 to thereby move down and separate the slide plate 36, and the slide segment 26a is moved in the outer peripheral direction. Thereafter, as shown by the two-dot line, the mold elevating portion 3 is moved down while maintaining the separated state of the upper heating mechanism 28 and the slide plate 36 to position the green tire 4 on the inner peripheral side of the slide segment 26a, after which the slide segment 26a is moved in the center direction by the fixed segment 26b. Then, as shown in FIG. 4, the slide segments 26a are placed in contact with each other to form a tubular mold corresponding to the tread portion 4a of the green tire 4, and the upper side mold 25 and the lower side mold 5 are placed in contact with the upper portion and the lower portion, respectively, of the mold to totally close the mold, and the mold elevating portion 3 and the mold locking portion 2 are locked by a lock- and holding mechanism (not shown), after which the cylinder rod 38a is moved out of the second cylinder member 38 to complete clamping of the mold.

High temperature vapor is supplied to the upper platen 32, the lower platen 6 and the fixed segment 26b of the split mold so that the upper and lower side molds 25 and 5 are heated by both the platens 6 and 32, and the slide segment 26a of the split mold is heated to heat the green tire 4 surrounded by these molds 25, 5 and 26a' from the outer surface side thereof. The pressurized medium such as vapor, nitrogen gas of high temperature and high pressure is supplied to the bladder 20 through the gas piping 17a to thereby move forward the bladder 20 into close contact with the inner wall surface of the green tire 4 and press the green tire 4 in the mold direction. The heat of the pressurized medium of high temperature and high voltage is transmitted to the green tire 4 through the bladder 20 to thereby heat the green tire 4 from the inner surface side thereof.

Further, as shown in FIG. 1, high frequency power is supplied from the high frequency power supply 24 to the induction heating oils 18, 23, 41 and 39. The first induction heating coil 18 and the third induction heating coil 41 supplied with high frequency power induction 25 heat the bead wires 52 and 52 provided internally of both the bead portions 4c and 4c' in preference by applying the intensive high frequency magnetic field to the lower bead portion 4c and the upper bead portion 4c' of the green tire 4. The fourth induction heating coil 39 induction heats, since the split mold 26 is formed of a non-magnetic material and divided in the inner peripheral direction, the belt member 56 provided internally of the tread portion 4a by applying the intensive high frequency magnetic field to the tread portion 4a of the tire 4. With this, since the green tire 4 is heated from the inside of the tire in the bead portions 4c, 4c' and the tread portion 4a having the great wall-thickness, in addition to the heating from the outer surface side and inner surface side as described above, the entire tire rises up to vulcanizing temperature in a short period of time.

The second induction heating coil 23 supplied with high frequency power applies the intensive high frequency magnetic filed to the magnetic member 20b of the bladder 20 to heat the bladder 20 itself. Accordingly, since when the heat of the pressurized medium is transmitted to the green tire 4 through the bladder 20, delay in transmission of heat by the bladder 20 is suppressed to the minimum, the green tire 4 further rises up to vulcanizing temperature. Vulcanizing-molding of the green tire 4 is carried out while maintaining the green tire 4 at fixed vulcanizing temperature. Since particularly, the magnetic member 20b of the bladder 20 has a part corresponding to the tread portion 4a, which is formed to have a larger area than other parts, a rise in temperature of the tread portion 4a of the green tire 4 is notable.

While the green tire 4 is being subjected to vulcanizing-molding, the bladder 20 presses the green tire 4 in the mold direction to mod the crude tire 5. Since at that time, the bladder 20 is formed of a low elongation material having substantially the same shape as the shape of the inner wall surface of the vulcanized tire, even if pressure of the pressurized medium has a minor variation, the shape of the inner wall surface of the vulcanized tire is positively realized. Accordingly, when the green tire 4 is pressed by the bladder 20 and molded, the vulcanized tire molded with high accuracy is obtained.

When the vulcanized tire is obtained as described above, as shown in FIG. 2, the mold is opened by the operation reversed to that described above, and after this, the bladder is contracted, and the vulcanized tire is held by the carrying-out device and carried outside. Thereafter, a new green tire 4 is carried in to repeat the vulcanizing-molding. Even if such vulcanizing-molding is repeated, the low elongation material maintains initial properties since the low elongation material of the bladder 20 is resistant to change in properties at high temperatures. Accordingly, even after repeated vulcanizing-molding, the shape of the inner wall surface of the vulcanized tire is positively realized by the bladder 20, and therefore, the bladder 20 can be used over a long period of time.

If a bladder for a vulcanizer capable of reducing frequency of exchange is merely provided, the bladder itself need not always be heated, but in the present embodiment, as a more preferred. embodiment, at least the bladder 20 itself is heated to thereby carry out vulcanizing-molding, as shown in FIG. 1. The vulcanizer 1 for carrying out vulcanizing-molding in accordance with this method has the constitution having a bladder 20 having a magnetic material in at least a part and elongated by a supply of pressurized medium such as vapor or nitrogen gas to press the inner wall surface of the green tire 4 in the mold direction, and a second induction heating coil 23 (field forming means) for heating the bladder 20 itself.

According to the constitution of the above-described vulcanizing-molding method and the vulcanizer 1, where vapor of high temperature and high pressure is supplied as a pressurized medium into the bladder 20, and the heat of the vapor is transmitted to the green tire 4 through the bladder 20 to thereby carry out vulcanizing-molding, since the bladder 20 itself is heated by the induction heating of a magnetic material, the heat quantity generated in the bladder 20 is also used to heat the inner wall surface of the tire. Accordingly, the vulcanizing-molding can be completed in a vulcanizing time reduced by the time required to heat the bladder 20, as compared with the conventional case where after the bladder 20 has been heated by the heat quantity of vapor, the inner wall surface of the tire is heated. Further, where the heat of the bladder 20 itself is increased, the vulcanizing-molding of the green tire can be accomplished merely by the heat generated by the bladder 20. In this case, since vapor of high temperature need not be used, various gases can be used as a pressurized medium.

While in the present embodiment, a film made of metal having magnetic properties such as mesh metal and metal vapor-deposited film as a magnetic material has been illustrated, the magnetic material is not limited thereto. That is, the magnetic material may be conductive rubber formed by mixing metal powder having magnetic properties. In this case, a degree of induction heating can be adjusted by the mixing quantity of metal powder.

Further, the present embodiment employs the constitution wherein the magnetic member 20b is formed so that a part corresponding to the tread portion 4a of the green tire 4 is made to have a larger area than other parts, whereby heat generation of the tread portion 4a (vulcanization delay part) corresponding to the great wall-thickness portion of the green tire 4 is accelerated than heat generation of other parts, in a such manner of which the magnetic material is concentrated on the tread portion 4a. According to this constitution, since the tread portion 4a of the green tire 4 receives a supply of more heat than other parts, the tread portion 4a having the great wall-thickness portion can be heated rapidly. Accordingly, the vulcanizing-molding of the green tire can be completed in a shorter period of time.

Figure 6:
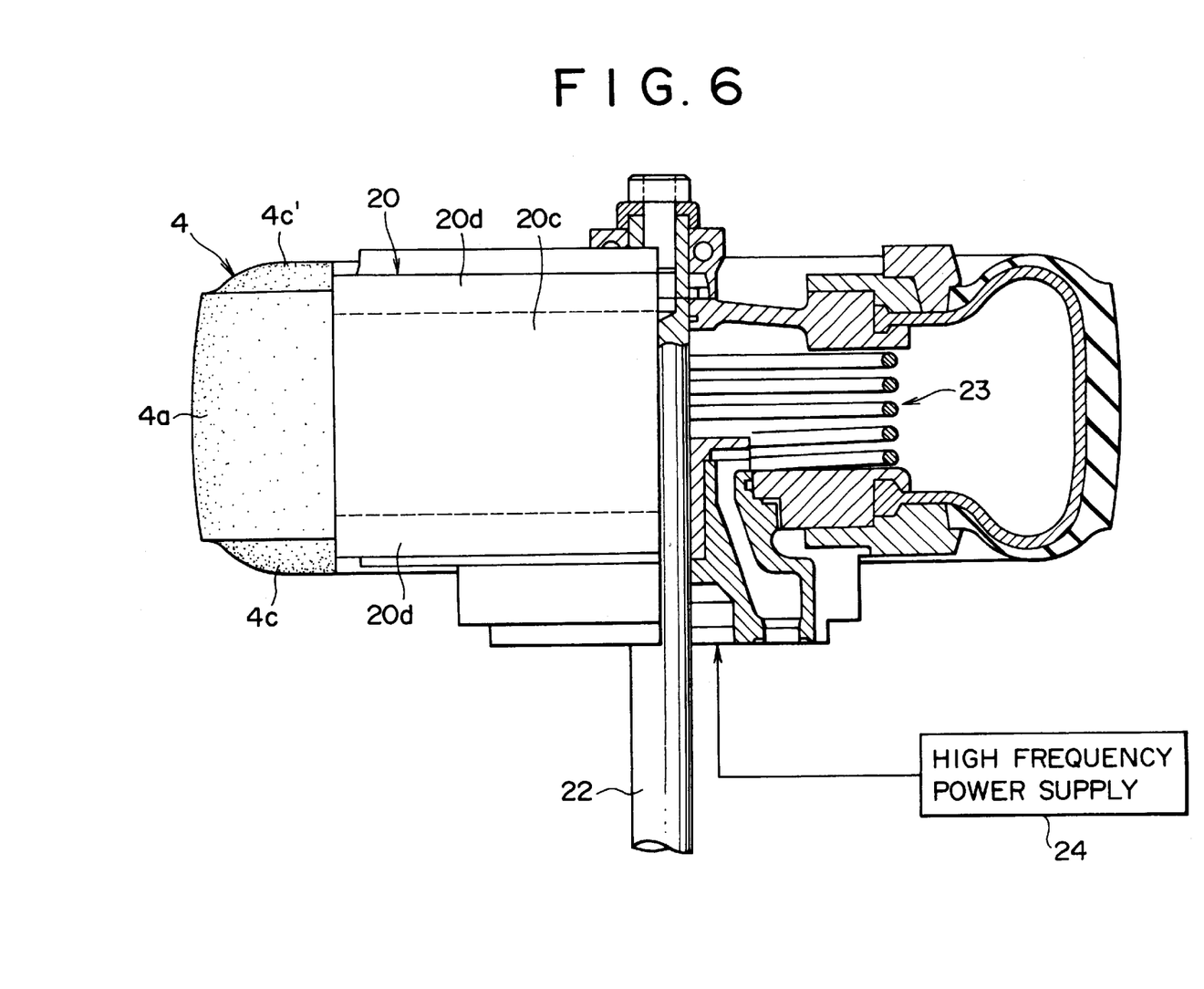
FIG. 6 shows a vulcanizer during a vulcanizing-molding process.

Further, while in the present embodiment, an area of the magnetic member 20b is enlarged more than other parts whereby the magnetic material is concentrated, means is not limited thereto. Where conductive rubber formed by mixing metal powder having magnetic properties as mentioned above is used as a magnetic material, such concentration can be made by increasing the mixing quantity of metal powder. More specifically, as shown in FIG. 6, by the provision of the constitution in which the bladder 20 is divided into a part corresponding to the tread portion 4a (a high concentration portion 20c) and other parts (a low concentration portion 20d) so that the mixing quantity of metal powder in the high concentration portion 20c is increased more than that in the low concentration portion 20d, the desired part (the tread portion 4a) can be heated rapidly.

Further, while in the present embodiment, the magnetic material is subjected to induction heating to thereby heat the bladder 20, the arrangement is not limited thereto, but power may be supplied to the conductive material to thereby heat the bladder 20.

Figure 7:
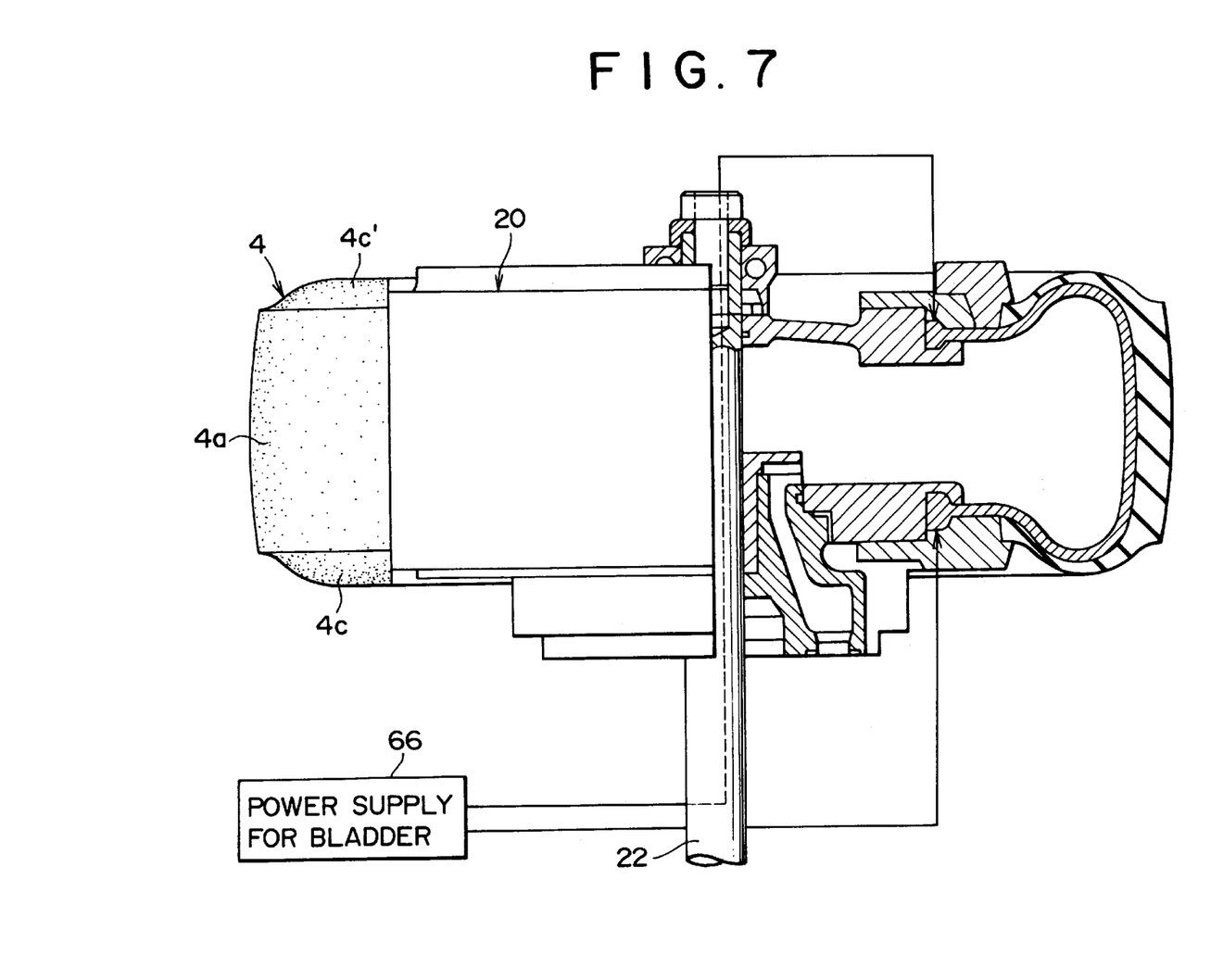
FIG. 7 shows a vulcanizer during a vulcanizing-molding process.
Figure 8:
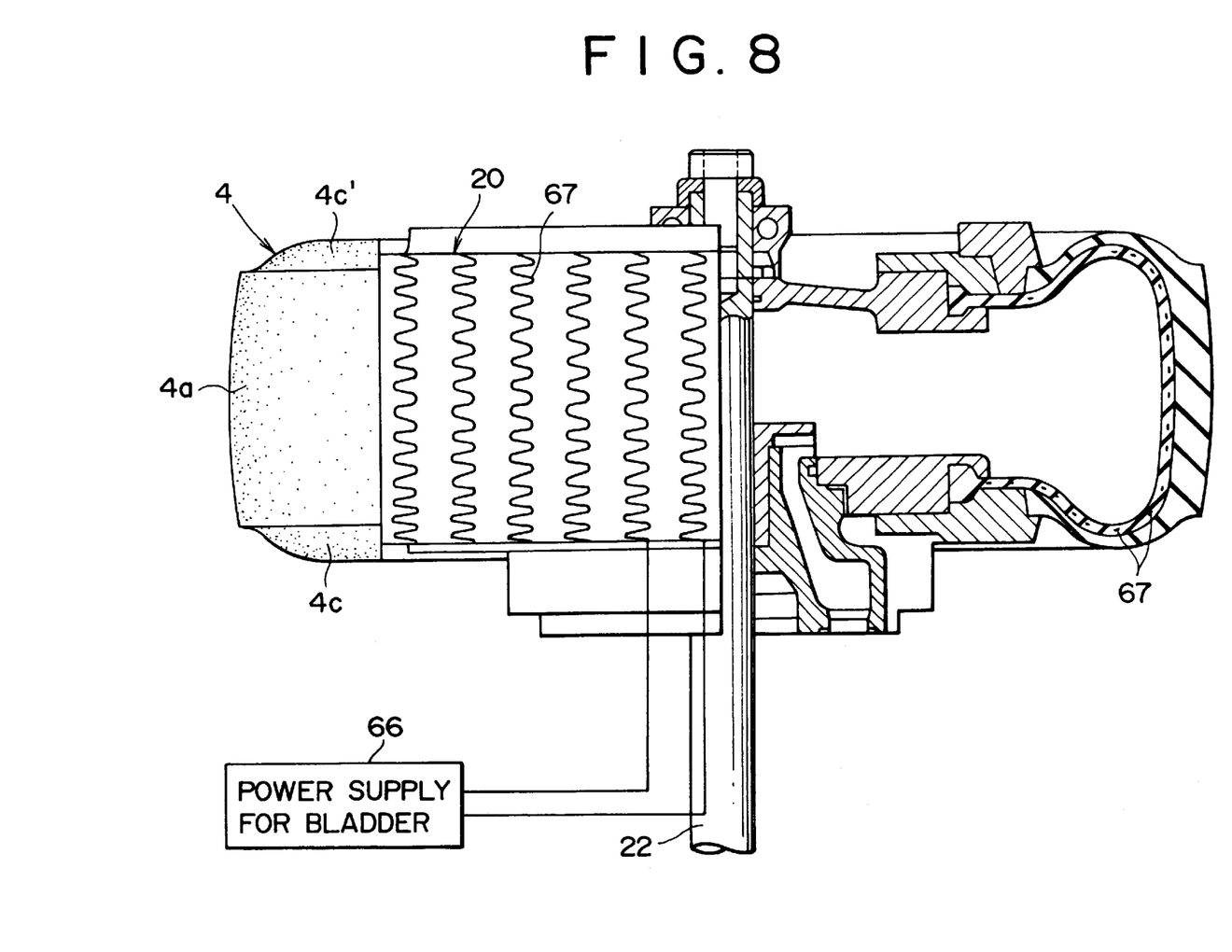
FIG. 8 shows a vulcanizer during a vulcanizing-molding process.

That is, as shown in FIG. 7, the vulcanizer 1 may be constituted in which the bladder 20 is formed of a conductive material such as conductive rubber, conductive fiber, conductive resin, metal cord material, etc., and a power supply for bladder 66 comprising a DC power supply or an AC power supply is connected to both ends of the bladder 20. Further, as shown in FIG. 8, the vulcanizer 1 may be constituted in which a heat generating coil 67 is embedded over the entire peripheral surface into the bladder 20, and the power supply for bladder 66 is connected to both ends of the heat generating coil 67. Preferably, the heat generating coil 67 is embedded in a bellows fashion so as not to impede extension of the bladder 20. Further, preferably, the heating coil 67 is arranged to be concentrated on he part corresponding to the tread portion 4a so that heat generation of the tread portion 4a (a vulcanization delay part) corresponding to the great wall-thickness portion of the green tire 4 is accelerated more than that of other parts.

Where the foregoing description makes reference to specific components or embodiments, known equivalents of such components or embodiments are herein incorporated as if individually set forth.

Although this invention has been described by way of example and with reference to possible embodiments thereof it is to be understood that modifications or improvements may be made thereto without departing from the scope of the invention as defined in the appended claims.

The entire disclosure of Japanese Patent Application Nos. 11-130775 and 11-130776 filed on May 12, 1999 including specification, claims, drawings and summary are incorporated herein by reference in its entirety.

What is claimed is:

1. In a vulcanizer having a mold for defining a shape of an outer wall of a tire after vulcanizing-molding, a vulcanizer bladder for pressing an inner wall of a green tire towards the mold during vulcanizing-molding, the vulcanizer bladder comprising:

a knitted or woven low elongation material with stable properties at vulcanizing-molding temperatures, wherein the low elongation material has an elongation at 200° C. in a range of 5%–15%, and wherein the vulcanizer bladder, at rest, has substantially the same shape as the inner wall of the tire after the vulcanizing-molding.

2. The vulcanizer bladder according to claim 1, wherein the knitted or woven low elongation material comprises at least one of organic fibers including material selected from the group consisting of nylons, polyesters, aramids, polyparaphenylene benzo-bis-oxazol (PBO), and polyphenylene sulfides;

inorganic fibers selected from the group consisting of glass fibers and carbon fibers;

metal cord material;

carbon-containing fiber;

metal-coated fiber; and resin-coated fiber.

3. The vulcanizer bladder according to claim 1, wherein the low elongation material is impregnated or coated with at least one elastomer and a resin selected from the group consisting of fluoride resins and silicone resins.

4. The vulcanizer bladder according to claim 1, further comprising a conductive material.

5. The vulcanizer bladder according to claim 4, wherein the conductive material comprises at least one selected from the group consisting of conductive rubber, conductive fiber, conductive resin, metal cord material and a heat generating coil.

6. The vulcanizer bladder according to claim 1, further comprising a magnetic material.

* * * * *